(12) United States Patent
Colven et al.

(10) Patent No.: US 9,007,910 B2
(45) Date of Patent: Apr. 14, 2015

(54) LOAD BALANCING ACROSS A LINK AGGREGATION GROUP

(75) Inventors: D. Michael Colven, Dallas, TX (US); Venkata Ramana Kiran Addanki, Montvale, NJ (US)

(73) Assignee: Fujitsu Limited, Kawasaki (JP)

( * ) Notice: Subject to any disclaimer, the term of this patent is extended or adjusted under 35 U.S.C. 154(b) by 239 days.

(21) Appl. No.: 13/436,524

(22) Filed: Mar. 30, 2012

(65) Prior Publication Data
US 2013/0258835 A1    Oct. 3, 2013

(51) Int. Cl.
*H04L 12/26* (2006.01)
*H04L 12/28* (2006.01)
*H04L 12/46* (2006.01)

(52) U.S. Cl.
CPC ..................... *H04L 12/4641* (2013.01)

(58) Field of Classification Search
CPC .................................................. H04L 12/4641
See application file for complete search history.

(56) References Cited

U.S. PATENT DOCUMENTS

| | | | |
|---|---|---|---|
| 6,553,029 B1 * | 4/2003 | Alexander | 370/389 |
| 7,623,456 B1 | 11/2009 | Chen et al. | |
| 2007/0237172 A1 * | 10/2007 | Zelig et al. | 370/465 |
| 2011/0261811 A1 * | 10/2011 | Battestilli et al. | 370/389 |
| 2011/0299528 A1 * | 12/2011 | Yu et al. | 370/390 |
| 2012/0033669 A1 * | 2/2012 | Mohandas et al. | 370/392 |
| 2012/0320929 A9 * | 12/2012 | Subramanian et al. | 370/419 |
| 2013/0028072 A1 | 1/2013 | Addanki | |

OTHER PUBLICATIONS

IEEE, "802,.1ad", IEEE Computer Society; Virtual Bridged Local Area Networks; pp. 1-129, Sep. 27, 2004.
IEEE, "802.1AX-2008-LAG", IEEE Computer Society; Link Aggregation; pp. 1-163, Nov. 3, 2008.
IEEE 802.1AX (2008): IEEE Std. 802.1AX-2008: IEEE Standard for Local and metropolitan area networks—Link Aggregation.

* cited by examiner

*Primary Examiner* — Un C Cho
*Assistant Examiner* — M Mostazir Rahman
(74) *Attorney, Agent, or Firm* — Maschoff Brennan

(57) ABSTRACT

A system includes a network element. The network element includes multiple egress ports configured as a LAG, an ingress port, and a distributor. The ingress port is configured to receive multiple packets including at least one flood domain. Additionally, the distributor is configured to access a virtual local area network identifier (VID) of each flood domain. Based on the VID and the number of egress ports in the LAG, the distributor is configured to select a representative egress port from the multiple egress ports. The distributor additionally forwards packets of each flood domain to the egress port of the LAG which is selected as the representative egress port for that flood domain.

20 Claims, 4 Drawing Sheets

Representative Egress Port (Flood Domain_n, LAG_a) = MOD [VID (Flood Domain_n, number of egress ports in LAG_a)] + 1

LOAD BALANCING ACROSS A LINK AGGREGATION GROUP

FIELD

The embodiments discussed herein are related to load balancing in communication networks.

BACKGROUND

A communication network may include network elements that route packets through the communication network. Some network elements may include a distributed architecture, in which packet processing may be distributed among several subsystems of a given network element. Some example subsystems of the network elements may include, but are not limited to, line cards, switches, bridges, distributors, and traffic managers. Some network elements may be used in a communication network as a multifunction Ethernet aggregation network element (multifunction network element), which may support one or more functions such as link aggregation, hashing, load balancing, or some combination thereof.

The multifunction network element may include the distributed architecture including one or more line cards and/or a bridge. Each of the line cards may include a modular electronic device that may provide network communication functionality. For example, some line cards may include, among other things, an Ethernet switch that may switch traffic through the network element and into a local area network (LAN). Additionally, the line cards may include modules that may process data such as frames or packets. The packets or frames may contain information such as a source address, a media access control (MAC) address, a destination address, data, or some combination thereof.

The bridge may also include a modular electronic device that provides network communication functionality. For example, the bridge may include, among other things, an Ethernet switch, ports, distributor, and modules to process hash rules and addresses. The modules may include processing resources and a memory configured to separate and map data received at ingress ports to output at egress ports. The data may also be flooded or multicast to all egress ports. When data is flooded, packets incoming from one source are transmitted to multiple destinations coupled to the egress ports without duplication. The destinations often share a group address so that only the devices that want the data receive it.

Additionally, communication networks may employ link aggregation. Link aggregation may generally describe the practice of using multiple network cables or ports in parallel to increase link speeds beyond the limits of any single cable or port. An example link aggregation standard is e.g., IEEE 802.1AX-2008. Link aggregation may additionally increase redundancy. In link aggregation, a group or set of ports may be combined and represented as a single logical port to other components of the network system. Various elements of the communication network system may "see" the aggregated ports known as a link aggregation group (LAG) as a single logical communication port in routing tables or databases of network elements external to the LAG.

In addition, to ensure high reliability and availability in communication networks, load balancing is often used. When implemented, load balancing typically provides for effective utilization of bandwidth for the network. In load balancing, the data stream at the ingress port is divided and transmitted on multiple ports in the LAG at the egress port. In some types of load balancing a hash rule is used which may be based on various characteristics of the data streams or packets at the ingress port. The hash rule may require complex algorithms, the determination of various characteristics of the data streams, some means to record the load balancing, or some combination thereof. Additionally, in load balancing of flooded traffic there is the potential that multiple data streams may be simultaneously multicast on the same egress port of the LAG. This may result in congestion.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system includes a network element. The network element includes multiple egress ports configured as a LAG, an ingress port, and a distributor. The ingress port is configured to receive multiple packets including at least one flood domain. Additionally, the distributor is configured to access a virtual local area network identifier (VID) of each flood domain. Based on the VID and the number of egress ports in the LAG, the distributor is configured to select a representative egress port from the multiple egress ports. The distributor additionally forwards packets of each flood domain to the egress port of the LAG which is selected as the representative egress port for the at least one flood domain.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
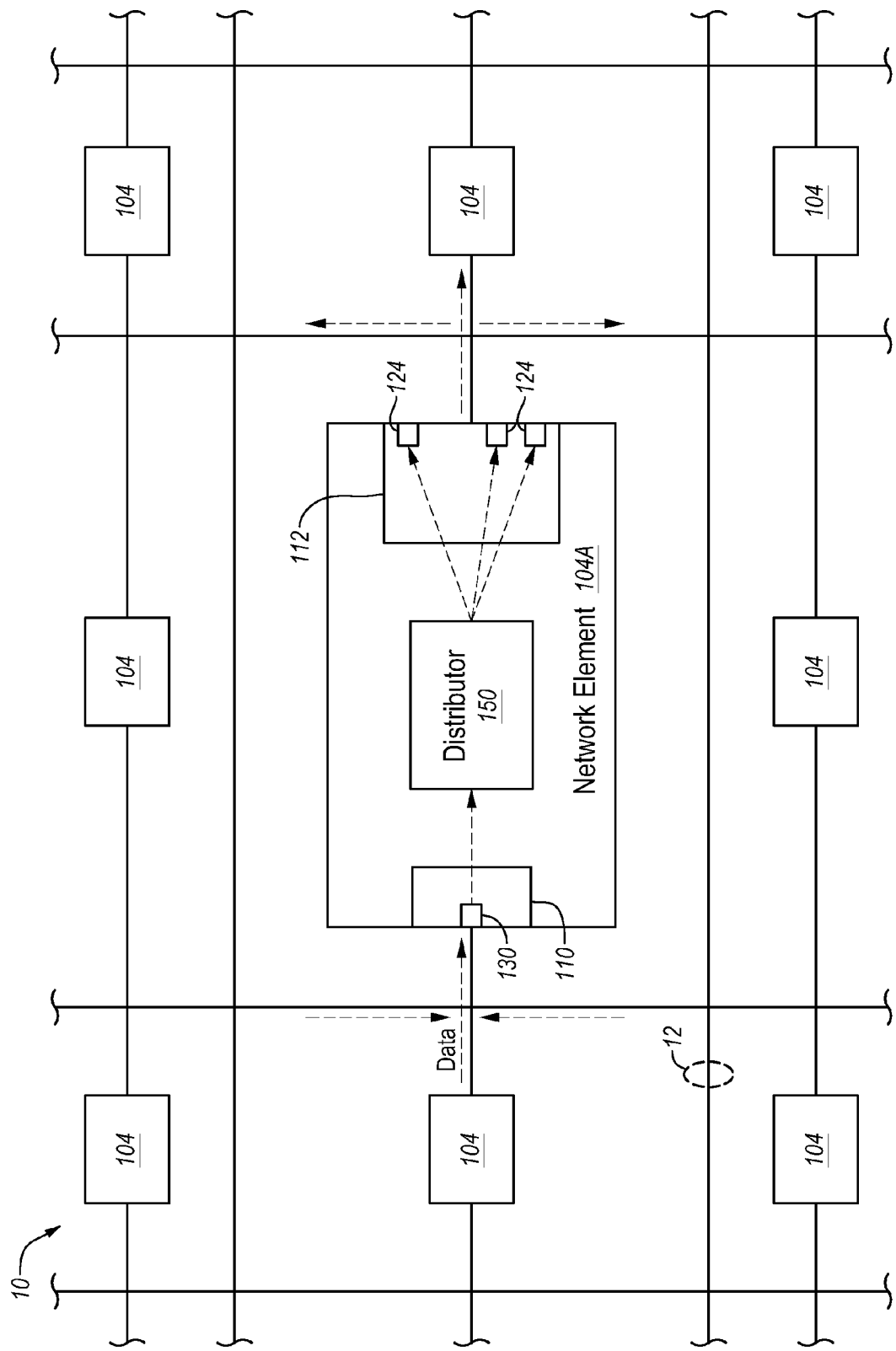
FIG. 1 illustrates a block diagram of an example network in which some embodiments may be implemented.

FIG. 1 illustrates a block diagram of an example network 10 in which some embodiments may be implemented. Generally, the network 10 may include transmission media 12 that communicatively couple network elements 104, including network element 104A. Any configuration of any number of network elements 104 and other devices may form the network 10. In addition, the network 10 may be integrated into and/or form a portion of one or more other networks. That is, although the network 10 is shown in a particular configuration, the network 10 may also be configured as a ring network or a point-to-point network, for example. Also, the network 10 may be a portion of a local area network (LAN) or a wide area network (WAN), for example.

The network elements 104 may include any equipment and/or facility that provide services related to telecommunication. An example configuration of the network element 104A is depicted in FIG. 1. The other network elements 104 may be configured similar to or different than the network element 104A.

The network element 104A may include an ingress line card 110 and one or more egress line cards 112 (collectively, line cards 110 and 112). In the network 10, the network element 104A may be coupled to other network elements 104 via the line cards 110 and 112. Data, represented by dashed lines in FIG. 1, may be received at an ingress port 130 of the ingress line cards 110 and be dispatched to another point in the communication network 10 via egress ports 124 on the egress line card 112. The line cards 110 and 112 may be communicatively coupled via the transmission medium 12 to other network elements 104. Additionally, the line cards 110 and 112 may enable the network element 104A to communicate to other network elements 104 using any suitable transmission protocol and/or standard. Each of the line cards 110 or 112 may include, but is not limited to, an Ethernet port, an optical port, or any other suitable port. In some embodiments, the ingress lines cards 110 may be interfaced to clients (not shown) of a network provider (not shown) while an egress lines card 112 may be interfaced to a provider network.

In the depicted embodiment, the network element 104A includes one ingress line card 110 with one ingress port 130 and one egress line card 112 with multiple egress ports 124. This depiction is not meant to be limiting, and more generally, each of the network elements 104 may include any number of line cards 110 and 112, ingress ports 130, and egress ports 124.

The network element 104A may include a distributor 150 that may manage communication of data from the ingress line card 110 to the egress line card 112. Specifically, the distributor 150 may select a representative egress port 124 from the egress ports 124, and then forward data to the representative egress port 124. Additionally or alternatively, the distributor 150 may flood or multicast the data to most or all of the egress ports 124. An example of a distributor 150 may be one or more switch fabrics.

Some additional details of the general function and the structure of the network element 104A are discussed below with respect to FIG. 2. Examples of the network element 104A and/or other network elements 104 may include, but are not limited to, an Ethernet switch or a multi-function Ethernet aggregation network element.

As mentioned above, the network 10 includes the transmission media 12. Functionally, the transmission media 12 transport one or more signals communicated by network elements 104 throughout the network 10. Accordingly, each transmission medium 12 may include any system, device, or apparatus configured to communicatively couple the network elements 104 to each other and communicate information between corresponding network elements 104. For example, each transmission medium 12 may include any one or more of an optical fiber, an Ethernet cable, a Ti cable, a WiFi signal, a Bluetooth signal, etc.

The network 10 communicates data, which may be referred to as traffic, data traffic, or data streams, over transmission media 12. As used herein, "data" means information transmitted, stored, or sorted in the network 10. The data may be transmitted over transmission media 12 in the form of optical or electrical signals configured to represent audio, video, and/or textual data, for example. The data may also be real-time or non-real-time data. The data may be communicated via any suitable communications protocol, including, without limitation, the Open Systems Interconnection (OSI) standard and Internet Protocol (IP).

The data communicated in the network 10 may be structured in any appropriate manner including, but not limited to, being structured in frames, packets, or an unstructured bit stream. In general, certain types of data are transmitted in packets. For example, Ethernet data may be transmitted in packets. The packets may contain multiple fields, which may include data, time stamps, source/destination addresses and/or other identifying information.

Modifications, additions, or omissions may be made to the network 10 without departing from the scope of the disclosure. The components and elements of the network 10 described may be integrated or separated according to particular needs. Moreover, the operations of the network 10 may be performed by more, fewer, or other components.

Figure 2:
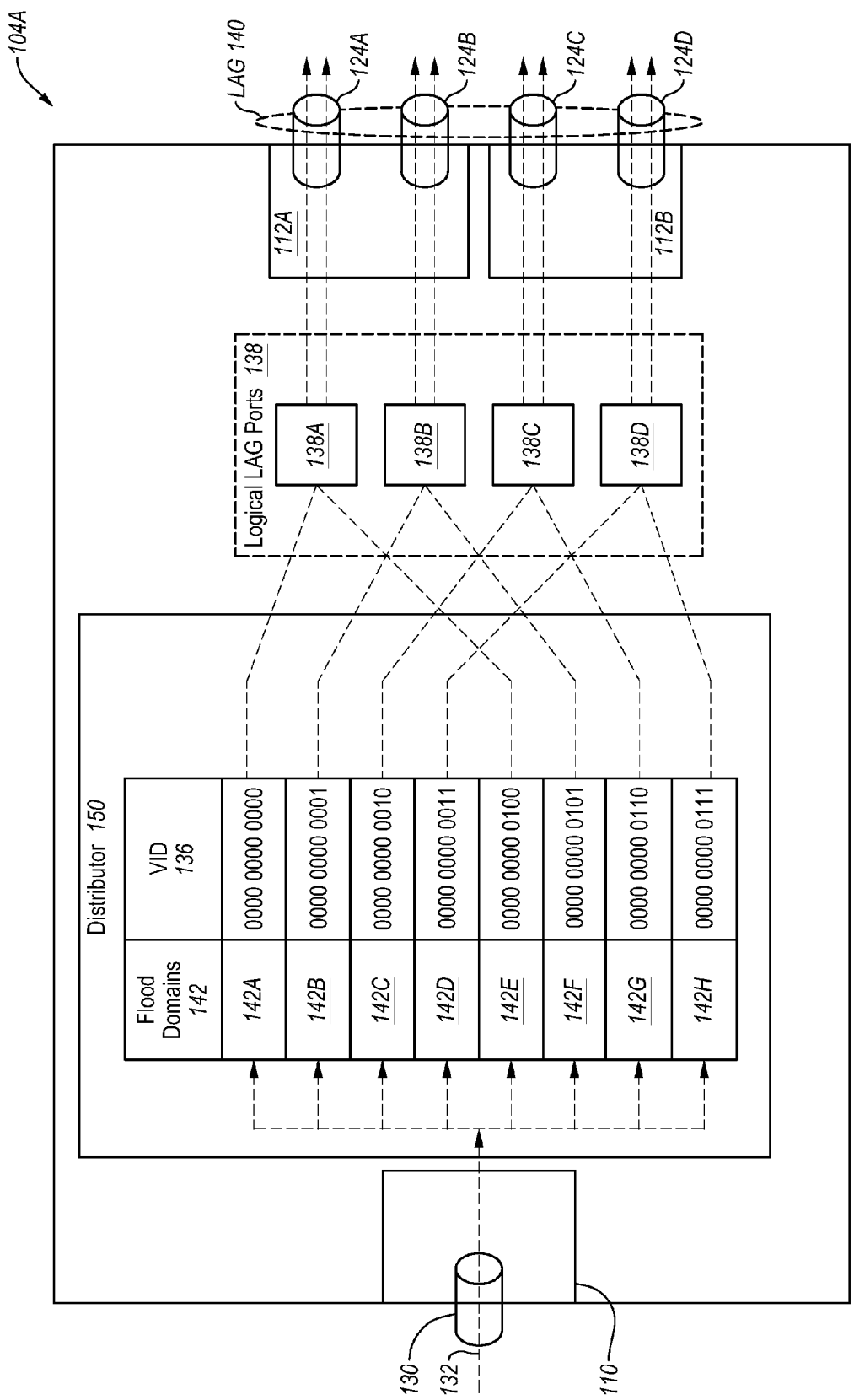
FIG. 2 is an example network element that may be included in the network of FIG. 1.

FIG. 2 illustrates an example of the network element 104A that may be included in the network 10 of FIG. 1. Some or all of the other network elements 104 of FIG. 1 may be configured similar to or different from the network element 104A illustrated in FIG. 2 The network element 104A may be configured to load balance one or more flood domains 142 across a LAG 140. With combined reference to FIGS. 1-2, the network element 104A enables the data, which can be structured into packets 132, to be transported on the transfer media 12 into the network element 104A and out to other network elements 104.

As described with respect to FIG. 1, the network element 104A of FIG. 2 may include the ingress port 130. The ingress port 130 may be configured to receive the packets 132, which include data. The ingress port 130 may be included on the ingress line card 110. Alternatively, the network element 104A may include multiple ingress ports 130 that combine to receive packets 132. Additionally or alternatively, in embodiments with multiple ingress ports 130, the multiple ingress ports 130 may be included on one ingress line card 110 or multiple ingress line cards 110.

The packets 132 may include unicast traffic, multicast traffic, broadcast traffic, or some combination thereof. Additionally, some portion of traffic may be unknown, that is, a specific destination for the packet 132 may be unknown. Generally, multicast traffic may include data traffic simultaneously delivered to multiple locations while unicast traffic may include data traffic delivered to a single location. Multicast traffic generally requires more bandwidth than unicast traffic. Thus, because the packets 132 may include unicast traffic, multicast traffic, broadcast traffic, or some combination thereof, the network element 104A may separate the packets 132 in a manner that avoids congestion when multiple packets 132 simultaneously include multicast traffic, for instance.

The packets 132 may include one or more flood domains 142. For example, in FIG. 2, the packets 132 include eight flood domains 142A-142H (collectively and generally "flood domains 142"). Each of the flood domains 142 includes a virtual local area network identifier (VID) 136.

The VID 136 may be included in the packets 132 to indicate from which virtual local area network (VLAN) the packet 132 originated and/or to which VLAN the packet 132 belongs. In some embodiments, the VID 136 may be a 12 digit binary identifier. The VID 136 may be accessed by the distributor 150 and/or read by another component such as the ingress line card 110 included in the network element 104A. Each of the flood domains 142 may include a corresponding VID 136 that is different from the VIDs 136 of the other flood domains 142 in the network element 104A.

Additionally, the network element 104A may include one or more egress ports 124 that may be configured as the LAG 140. The LAG 140 may include egress ports 124 on one or more egress line cards 112. As depicted, the LAG 140 includes egress ports 124A-124D located on egress line cards 112A and 112B. However, this depiction is not meant to be limiting. The LAG 140 may include any number of egress ports 124 that may be physically located on any number of egress line cards 112.

The egress ports 124 represent physical ports included in the network element 104A. Each of the egress ports 124 may correspond to a logical LAG port 138, including LAG ports 138A-138D. In this and other embodiments, a first logical LAG port 138A corresponds to a first egress port 124A, a second logical LAG port 138B corresponds to a second egress port 124B, a third logical LAG port 138C corresponds to a third egress port 124C, and a fourth logical LAG port 138D corresponds to a fourth egress port 124D. The notion of logical LAG ports 138 is mentioned to reinforce that the LAG 140 is a logical concept related to physical components. Thus, the LAG 140 may include four logical LAG ports 138A-138D that respectively correspond to four egress ports 124A-124D. Moreover, the logical LAG ports 138 may correspond to egress ports 124, which may be arbitrarily numbered and/or may be numbered according to any suitable convention. For example, the first logical LAG port 138A may correspond to a first egress port 124A which may be numbered 88 according to its position on the network element 104A, for instance.

The LAG 140 includes a number of egress ports 124 and/or a number of logical LAG ports 138. The number of egress ports 124 and/or the number of logical LAG ports 138 may be identified. For example, in the depicted and other embodiments, the LAG 140 includes four egress ports 124A-124D and four logical LAG ports 138A-138D. The number of "ports" in the LAG 140 may be the number of egress ports 124 and/or the number of logical LAG ports 138. In the depicted embodiment, these numbers are the same. However, this depiction is not limiting. In some embodiments, the number of logical LAG ports 138 may be different from the number of egress ports 124. That is, the first logical LAG port 138A and the second logical LAG port 138B may correspond to the first egress port 124A. Alternatively, the first logical LAG port 138A may correspond to the first egress port 124A and the second egress port 124B or some portion(s) thereof. Thus, the LAG 140 may include a different number of logical LAG ports 138 than egress ports 124. For simplicity, the number of logical LAG ports 138 and the number of egress ports 124 in the LAG 140 are described herein as "the number of egress ports 124."

The distributor 150 may identify the number of egress ports 124 in the LAG 140. Alternatively, the number of egress ports 124 in the LAG 140 may be entered by an operator and/or identified by an alternative component included in the network element 104A. In some embodiments, the number of egress ports 124 may vary due to component failures and/or system changes, for instance. In these and other embodiments, the number of egress ports 124 included in the LAG may be periodically or continuously updated.

Additionally, the distributor 150 may access the VID 136 for each flood domain 142. The distributor 150 may select a representative egress port (not shown) for each flood domain 142A-142H. Again, the representative egress port may be a logical LAG port 138 and/or an egress port 124. For simplicity, the representative egress port may be described in relationship to the egress ports 124.

In some embodiments, the distributor 150 may select the representative egress port from the egress ports 124 based on the VIDs 136. That is, the distributor 150 may select the representative egress port for each of the flood domains 142A-142H by entering one or more of the VIDs 136 into some operation or operations.

In some alternative embodiments, the distributor 150 may select the representative egress port from the egress ports 124 based on the VIDs 136 and the number of egress ports 124. That is, the distributor 150 may select the representative egress port by entering one or more of the VIDs 136 and the number of egress ports 124 into some operation or operations.

An example of the operation for selecting the representative egress ports may include a modulo operation. Simplistically, the modulo operation may generally return a remainder when two numbers are divided by one another. Notably, the modulo operation is more complex than just the remainder when used in negative numbers and/or when one of the numbers is equal to zero.

Figures 3A, 3B:
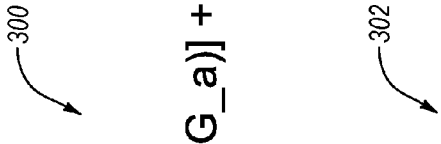
FIG. 3A is an example operation for selecting a representative egress port in the network element of FIG. 2.
FIG. 3B is a table of representative egress port selection results.

Referring to FIG. 3A, an example operation 300 including a modulo operation for selecting a representative egress port in the network element 104A of FIG. 2 is presented. With combined reference to FIGS. 2 and 3A, the operation 300 may be performed for each flood domain 142A-142H. In the operation 300, the representative egress port for a flood domain 142 in the LAG 140 is equal to the modulo function of the VID 136 of the flood domain 142 and the number of egress ports 124 in the LAG 140 plus 1. For example, the representative port for the first flood domain 142A in the LAG 140 according to the example operation 300 of FIG. 3A is equal to the modulo of 0000 0000 0000 0000 (the first VID 136 of the first flood domain 142A) and 4 (the number of egress ports 124 in the LAG 140)+1, which may be equal to "1" in this case. Thus, the representative egress port is "1" which may indicate the first logical LAG port 138A and/or the first egress port 124A may be the representative egress port for the first flood domain 142A. As understood by those with skill in the art, the operation 300 may be performed for any number of flood domains 142, any number of LAGS 140, etc.

The operation 300 of FIG. 3A is not the only operation that may be used for selecting a representative egress port. For example, a second modulo operation (not shown) may be used for selecting a representative egress port. With reference to FIG. 2, the second modulo operation may include calculating the representative egress port for a flood domain 142 in the LAG 140 as the modulo function of the VID 136 of the flood domain 142 and the number of egress ports 124 in the LAG 140. In the second modulo operation, the addition of 1 is omitted compared to the first modulo operation already described. Use of the second modulo operation may be determined by the manner in which the egress ports included in a LAG 140 are numbered. Specifically, in embodiments in which the egress ports 124 included in the LAG 140 are numbered 0 to (N−1), the second modulo operation may be used to select a representative egress port.

As demonstrated by the two above examples, the operation by which the representative egress ports is selected may normalize or compensate for the manner in which the egress ports 124 included in a LAG 140 are numbered. That is, in some embodiments, the operation used for selecting a representative egress port such as operation 300 of FIG. 3A or the second operation may be adapted using a normalizing component.

Referring to FIG. 3B, a table 302 of representative egress port selection results is presented. With combined reference to FIGS. 2, 3A, and 3B, the table 302 includes a first column 302A identifying the flood domains 142, a second column 302B identifying the respective VIDs 136, a third column 302C identifying the respective logical LAG ports 138, and a fourth column 302D identifying the respective egress ports 124 obtained by applying the operation 300 as described above for each of the flood domains 142.

Referring back to FIG. 2, the distributor 150 may map the flood domains 142 to the representative egress ports, as denoted by the dashed lines connecting each flood domain 142 and corresponding VID 136 to a corresponding one of the logical LAG ports 138. In FIG. 2, the mapping depicts the representative egress port selection results of table 302 of FIG. 3B. In some embodiments, selecting representative egress ports based on the VID 136 as described above may balance packets 132 among the egress ports 124 of the LAG 140. Specifically, two flood domains 142 are mapped to each of the logical LAG ports 138 and accordingly, to each of the egress ports 124.

A similar result may be obtained when the number of flood domains 142 does not divide equally by the number of egress ports 124 included in the LAG 140. For instance, consider an example in which the LAG 140 includes three egress ports 124 and the packets 132 include eight flood domains 142. Using an operation based on the VID 136, the distribution may be substantially even among the egress ports 124. Specifically, using the operation 300 of FIG. 3A in this and other examples involving a LAG with three egress ports and eight flood domains, the mapping may include three flood domains mapped to each of a first egress port and a second egress port and two flood domains mapped to a third egress port.

Additionally, the distributor 150 may forward the packets 132 of each flood domain 142 to the egress port 124 of the LAG 140 which is selected as the representative egress port for that flood domain 142. Forwarding the packets 132 may include transmitting the packets 132 to the egress cards 112A and 112B and/or making the packets 132 otherwise available to the egress ports 124. The distributor 150 may thereby balance the load of flood domains 142 across the egress ports 124 of the LAG 140.

In some embodiments, the distributor 150 may be configured to recover from a failure using similar procedures to initially load balance the flood domains 142. A failure may include, but is not limited to, a component failure, a restart, or an upgrade. Following the failure, rather than referring to a table that recorded or otherwise logged which flood domain 142 was mapped to which egress port 124, the distributor 150 may re-perform the initial load balancing of flood domains 142. This may reduce memory requirements of the distributor 150 and/or the network element 104.

For example, following the failure, the distributor 150 may re-access the VID 136 of the flood domains 142, then reselect the representative egress ports, re-map the flood domains 142 to the representative egress port; and then forward the packets 132 of each flood domain 142 to the egress port 124 of the LAG 140 which is selected as the representative egress port for that flood domain 142. As with the initial load balancing, the reselection of the representative egress ports may be based on the VID 136 and/or the number of egress ports 124.

The line cards 110 and 112 and the distributor 150 in the network element 104 may include logic and memory. Logic may perform the operations of the component, for example, execute instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more controllers, one or more microcontrollers, and/or other logic.

A memory stores information. A memory may include one or more tangible, computer-readable, and/or computer-executable storage medium. Examples of memory include computer memory (for example, Random Access Memory (RAM) or Read Only Memory (ROM)), mass storage media (for example, a hard disk), flash memory, or other suitable memory, or any combination thereof.

Figure 4:
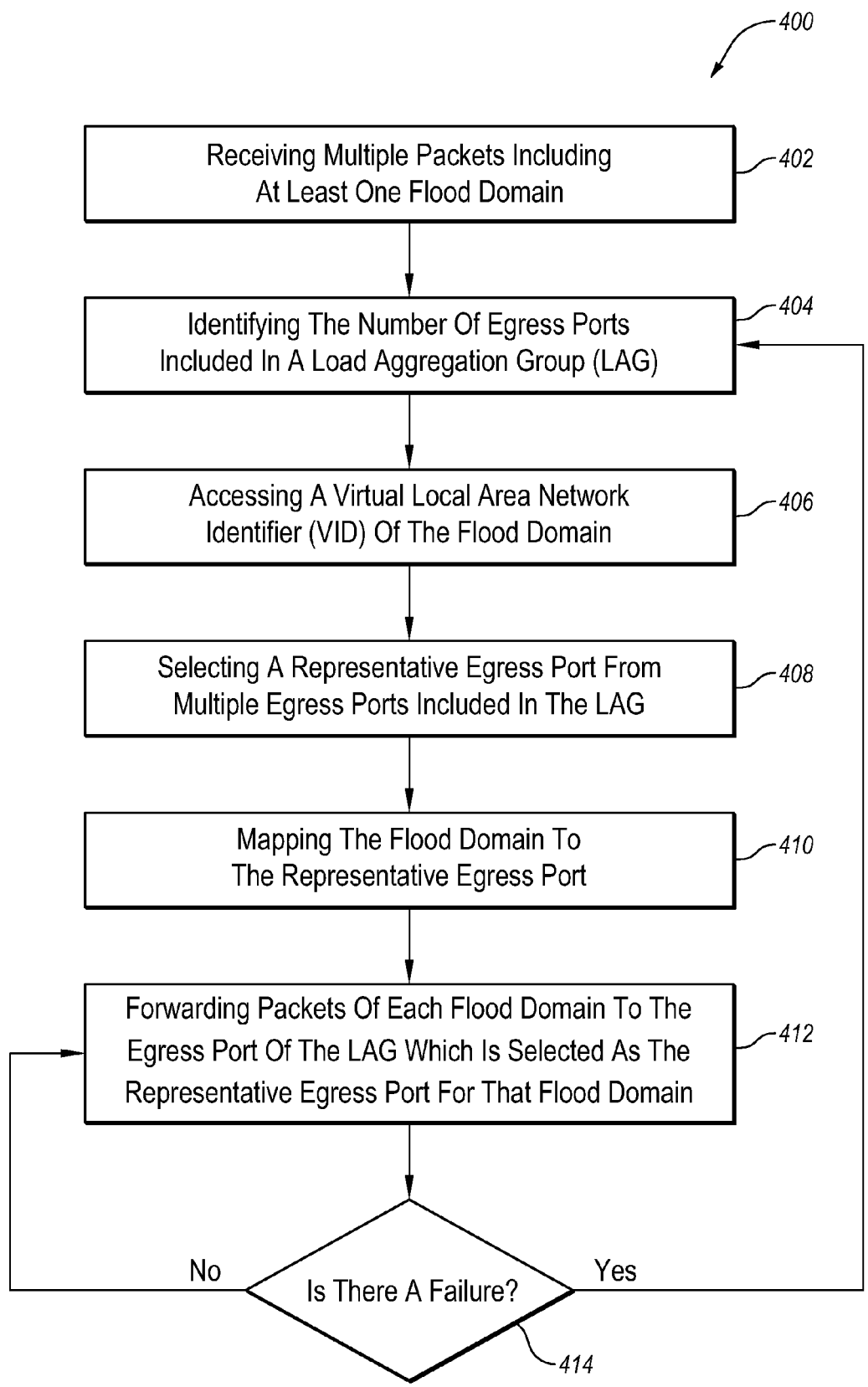
FIG. 4 is a flow diagram of an example method for load balancing flood domains across a link aggregation group.

FIG. 4 illustrates a flow diagram of an example method 400 for load balancing flood domains across a LAG that can be implemented in the network 10 of FIG. 1 and may be performed by the network element 104A of FIGS. 1-2 in some embodiments. One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The method 400 may begin at 402 by receiving multiple packets. The packets may include at least one flood domain. In some embodiments and/or when implemented by some systems, the packets may include about 4096 flood domains. However, the specific number of flood domains is not limited to or necessarily expected to be 4096. Additionally, the packets may include unicast data traffic, multicast data traffic, broadcast data traffic, or some combination thereof. Any or all of the data traffic may be known or unknown. One potential advantage of the method 400 may include the avoidance of multiple flood domains simultaneously multicasting on one egress port of the LAG.

At 404, the method 400 may include identifying a number of egress ports included in the LAG. For example, as discussed with respect to FIG. 2, the LAG may include four egress ports. More generally, LAGs may include any number of egress ports and may span or include egress ports on one egress card or potentially more than one egress cards.

In the method 400, operations 406, 408, 410, 412 may be performed for each flood domain. However, in alternative methods, any or all of the operations 406, 408, 410 412 may be performed for some combination multiple flood domains simultaneously and/or in an overlapping manner.

At 406, the method 400 may include accessing a virtual local area network identifier (VID) of each flood domain. As mentioned above, one potential advantage of the method 400 may include load balancing the flood domains based on the VIDs, which may be readily and easily accessible.

At 408, the method 400 may include selecting a representative egress port from multiple egress ports included in a LAG. The selection of the representative egress port may be based on the VID and/or the number of egress ports in the LAG. In some embodiments, the selection of the representative egress port based on the VID and/or the number of egress ports may include applying a modulo operation and/or a normalizing component. For example, one non-limiting modulo operation may include obtaining a result of performing "VID modulo the number of egress ports in the LAG" (MOD [VID, number of egress ports]) and adding 1 to the result. In this modulo operation, the normalizing component is the "adding 1." By adding 1 to the result of the modulo operation, the representative egress port may properly correlate to an egress port included in the LAG.

Alternatively, in some embodiments, a second modulo operation may include obtaining a result of performing "VID modulo the number of egress ports in the LAG" (MOD [VID, number of egress ports]). In the second modulo operation, the normalizing component is omitted. Whether to apply the first modulo operation or the second modulo operation and more specifically whether to include the normalizing component may be based on the numbering of the egress ports included in the LAG.

For example in some embodiments, the egress ports included in the LAG are numbered 1 to N where N is a whole integer and represents the total number of egress ports included in the LAG. Thus, in this and other embodiments, the modulo operation may include the normalizing component. In alternative embodiments, the egress ports included in the LAG may be numbered 0 to (N−1) where N is a whole integer and represents the total number of egress ports included in the LAG. In this and other embodiments, the modulo operation may not include the normalizing component.

In these examples, the normalizing component includes "adding 1." However, the normalizing component may more generally include an equation, process, or calculation that compensates for the number of the egress ports in the LAG and/or any numbering convention included in the network element.

At 410, the method 400 may include mapping the flood domain to the representative egress port. In some embodiments, mapping the flood domain to the representative egress port may achieve an even distribution of flood domains across the egress ports included in the LAG. For example, if the LAG includes four egress ports and the packets include eight flood domains, the mapping may achieve a distribution of two flood domains mapped to each egress port.

In alternative embodiments, mapping the flood domain to the representative egress ports may achieve a substantially even distribution. For example if the LAG includes three egress ports and the packets include eight flood domains, the mapping may achieve a distribution of three flood domains to two of the three egress ports and two flood domains to the third egress ports. Essentially, the load balance may be achieved statistically across the multiple flood domains rather than dynamically within the individual flood domains.

At 412, the method 400 may include forwarding packets of each flood domain to the egress port of the LAG which is selected as the representative egress port for that flood domain. According to some embodiments, the forwarding of packets may be continuous so long as a failure, a restart, or an upgrade does not occur. That is, the system may continue to forward packets according to the mapping of the flood domain to the representative port selected for the flood domain.

At 414, the method 400 may determine whether there is a failure. As already explained above, a failure may include a failure of a physical component such as an egress port, a restart of the system performing the method 400, an upgrade of the system performing the method 400, or some combination thereof. If there is not a failure, the method 400 continues to 412 where the system continues to forward packets according to the mapping of the flood domain to the representative port selected for the flood domain.

If however, there is a failure, the method 400 may include recovering from a failure, a restart, or an upgrade by returning to 404 and then progressing through 404, 406, 408, 410, and 412. For example, in embodiments in which the selection of the representative ports is based on the number of egress ports in the LAG, the method 400 may include re-identifying the number of egress ports in 404 and then progressing through 406, 408, 410, and 412 to load balance the flood domains across the LAG. That is, if an egress port has failed, recovering from a failure may include re-identifying the number of egress ports to re-select the representative ports for each flood domain.

In alternative embodiments, if there is a failure, the method 400 may include recovering from a failure, a restart, or an upgrade by continuing to 406 rather than 404 (not shown). For example, if the selection of the representative egress port is based only on the VID there is no need to re-identify the number of egress ports in the LAG.

In these and other embodiments of recovering from a failure, a restart, or an upgrade, the method 400 can proceed without accessing a memory or a table of the previously selected representative egress ports. Instead, the method 400 includes some subset of operations 404, 406, 408, 410, and/or 412 to load balance flood domains across the LAG.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
receiving a plurality of packets including at least one flood domain;
identifying a number of egress ports in a plurality of egress ports included in a link aggregation group (LAG); and
for each flood domain:
accessing a virtual local area network identifier (VID) of the flood domain;
calculating a result of VID modulo the number of egress ports (MOD [VID, number of egress ports]);
normalizing the result based on a manner in which the plurality of egress ports in the LAG are numbered;
selecting a representative egress port from the plurality of egress ports included in the LAG based on a normalized result; and
forwarding packets of each flood domain to the egress port of the LAG which is selected as the representative egress port for that flood domain.

2. The method of claim 1, wherein the plurality of packets includes at least one of unicast data traffic, multicast data traffic, and broadcast data traffic.

3. The method of claim 2, further comprising:
for each flood domain, mapping the flood domain to the representative egress port selected for the flood domain to achieve an even distribution or substantially even distribution of flood domains across the plurality of egress ports included in the LAG.

4. The method of claim 1, further comprising recovering from a failure, a restart, or an upgrade by:
for each flood domain:
re-accessing the VID of the flood domain;
based on the VID and the number of egress ports, reselecting a representative egress port from the plurality of egress ports included in the LAG;
mapping the flood domain to the representative egress port; and
forwarding packets of each flood domain to the egress port of the LAG which is selected as the representative egress port for that flood domain.

5. The method of claim 4, wherein selecting the representative egress port and reselecting the representative egress port includes performing a same operation.

6. The method of claim 1, wherein the plurality of packets include up to 4096 flood domains.

7. The method of claim 1, wherein the normalizing includes adding 1 to the result.

8. A network element comprising:
a plurality of egress ports configured as a link aggregation group (LAG);
an ingress port configured to receive a plurality of packets including at least one flood domain; and
a distributor configured to:
access a virtual local area network identifier (VID) of the at least one flood domain,
identify a number of egress ports in the LAG,
calculate a result of VID modulo the number of egress ports (MOD [VID, number of egress ports]),
normalize the result based on a manner in which the plurality of egress ports in the LAG are numbered,
select a representative egress port from the plurality of egress ports based on a normalized result, and
forward packets of the at least one flood domain to the egress port of the LAG which is selected as the representative egress port for the at least one flood domain.

9. The network element of claim 8, wherein the distributor is further configured to map the at least one flood domain to the representative egress port.

10. The network element of claim 9, wherein the distributor is further configured to map the at least one flood domain to the representative egress port to achieve an even distribution or substantially even distribution of flood domains across the plurality of egress ports included in the LAG.

11. The network element of claim 10, wherein the distributor is further configured to recover from a failure by:
re-accessing the VID of the at least one flood domain;
based on the VID and the number of egress ports, reselecting a representative egress port from the plurality of egress ports included in the LAG;
re-mapping the at least one flood domain to the representative egress port; and
forwarding packets of each flood domain to the egress port of the LAG which is selected as the representative egress port for that flood domain.

12. The network element of claim 8, further comprising one or more ingress line cards that include the ingress port.

13. The network element of claim 8, further comprising two or more egress line cards including the plurality of egress ports such that the LAG includes egress ports from two or more egress line cards.

14. The network element of claim 8, wherein the plurality of packets includes unicast traffic, multicast traffic, and broadcast traffic.

15. The network element of claim 8, wherein the distributor includes a switch fabric.

16. The network element of claim 8, wherein the distributor is configured to normalize the result by adding 1 to the result.

17. An article of manufacture comprising:
a non-transitory computer readable storage medium having loaded thereon computer-executable instructions that are executable by a processor to perform operations comprising:
receiving a plurality of packets including at least one flood domain;
identifying a number of egress ports in a plurality of egress ports included in a link aggregation group (LAG); and
for each flood domain:
accessing a virtual local area network identifier (VID) of the flood domain;
calculating a result of VID modulo the number of egress ports (MOD [VID, number of egress ports]);
normalizing the result based on a manner in which the plurality of egress ports in the LAG are numbered;
selecting a representative egress port from the plurality of egress ports included in the LAG based on a normalized result; and
forwarding packets of each flood domain to the egress port of the LAG which is selected as the representative egress port for that flood domain.

18. The article of manufacture of claim 17, wherein the operations further comprise recovering from a failure, a restart, or an upgrade by:
for each flood domain:
re-accessing the VID of the flood domain;
based at least partially on the VID, reselecting a representative egress port; and forwarding packets of each flood domain to the egress port of the LAG which is selected as the representative egress port for that flood domain.

19. The article of manufacture of claim 18, wherein selecting the representative egress port and reselecting the representative egress port includes performing a same operation.

20. The article of manufacture of claim 17, wherein the normalizing includes adding 1 to the result.

\* \* \* \* \*